March 7, 1967     H. G. MAZUR     3,307,280
DISPLAY APPARATUS

Filed Oct. 7, 1964                            3 Sheets-Sheet 1

INVENTOR.
HARRY G. MAZUR
BY Seidel & Gonda
ATTORNEYS

March 7, 1967  H. G. MAZUR  3,307,280
DISPLAY APPARATUS
Filed Oct. 7, 1964  3 Sheets-Sheet 2
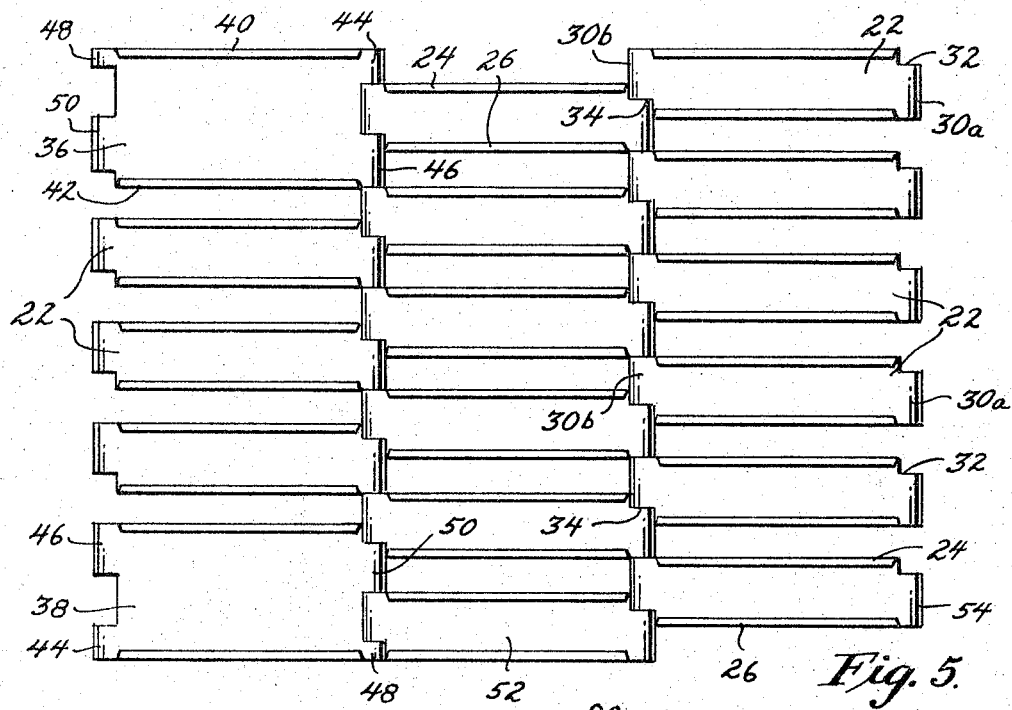
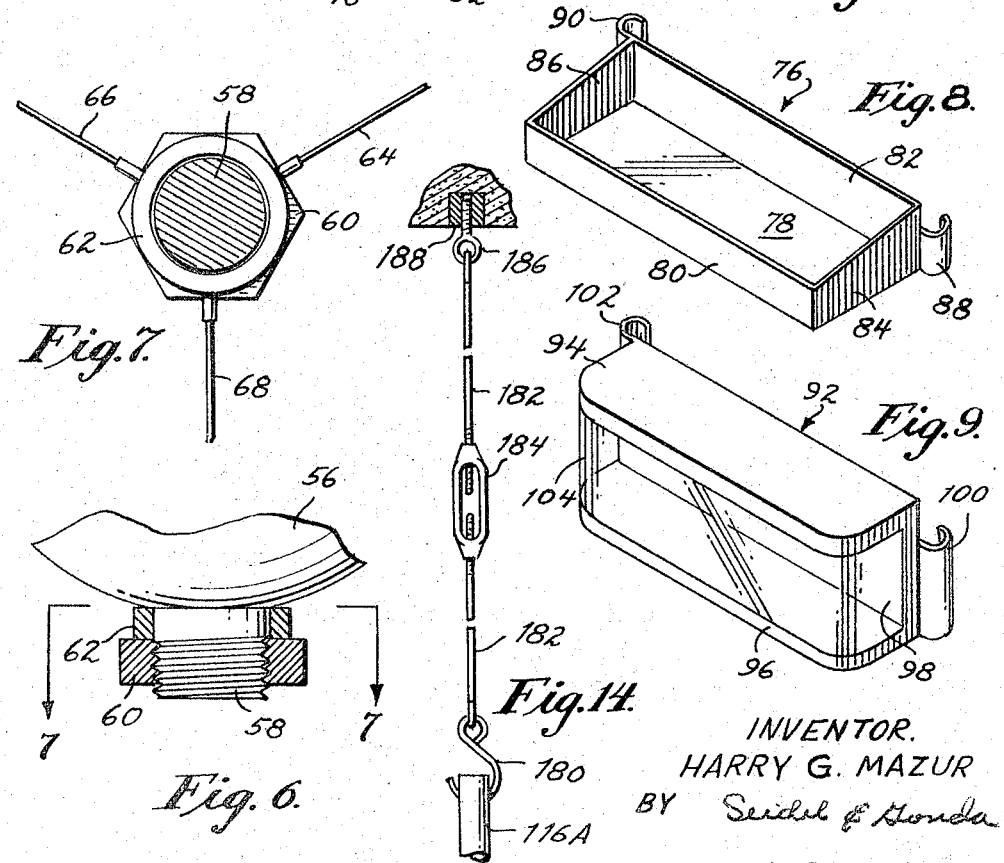
INVENTOR.
HARRY G. MAZUR
BY Seidel & Gonda
ATTORNEYS.

March 7, 1967 H. G. MAZUR 3,307,280
DISPLAY APPARATUS
Filed Oct. 7, 1964 3 Sheets-Sheet 3

INVENTOR.
HARRY G. MAZUR
BY Seidel & Gonda
ATTORNEYS.

United States Patent Office 3,307,280
Patented Mar. 7, 1967

3,307,280
DISPLAY APPARATUS
Harry G. Mazur, Melrose Park, Pa., assignor to Display Corporation of America, Philadelphia, Pa., a corporation of Pennsylvania
Filed Oct. 7, 1964, Ser. No. 402,212
13 Claims. (Cl. 40—124)

This invention relates to a display apparatus. More particularly, it relates to a display apparatus for advertising and merchandise.

In accordance with the present invention a sign is provided which may be used both indoors and outdoors. Further, the sign is of a design which may be of any size without loss of effectiveness in its ability to display or advertise goods. Further, the apparatus in accordance with the present invention incorporates novel construction features whereby it may be converted from a sign to a display rack for goods or vice versa.

It is a general object of this invention to provide a novel display apparatus.

It is another object of this invention to provide a novel display apparatus which is adapted for both indoor and outdoor use, and which permits modular interchange of components.

It is still another object of the present invention to provide a novel display apparatus which is not greatly effected by the force of wind.

It is yet another object of the present invention to provide a novel display apparatus which may be readily converted for the display of either advertising copy or goods.

It is a further object of the present invention to provide a novel display apparatus which is light in weight, rigid in construction and can withstand the effects of wind force.

It is still another object of the present invention to provide a novel display apparatus which may be erected in one of several forms using substantially the same material.

Other objects will appear hereinafter.

For the purpose of illustrating the invention, there are shown in the drawings forms which are presently preferred; it being understood, however, that this invention is not limited to the precise arrangement and instrumentalities shown.

FIGURE 5 is a view of the display device retaining means laid out in partially assembled fashion.

FIGURE 6 is an enlarged partial sectional view taken along the line 6—6 of FIGURE 3.

FIGURE 7 is a sectional view taken along the line 7—7 of FIGURE 6.

FIGURE 8 is a perspective view of a modified retaining means.

FIGURE 9 is a perspective view of a second modified retaining means.

FIGURE 14 is a plan view of an alternate reinforcing construction which may be used with the present invention.

Figure 1:
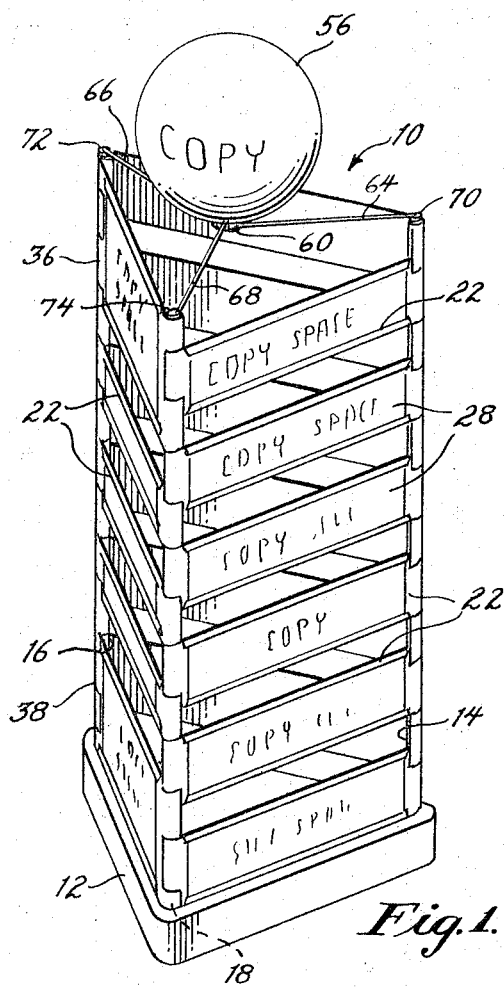
FIGURE 1 is a perspective view of one embodiment of the present invention.

Referring now to the drawings, there is shown in FIGURES 1, 2, 3 and 4 a dislay apparatus constructed in accordance with one embodiment of the present invention.

As shown in FIGURE 1, the display apparatus 10 comprises a triangular base 12 which preferably is equilateral in form. Posts 14, 16 and 18 are shown mounted upon base 12 adjacent each corner thereof. The base 12 may be hollow. As shown, the posts 18 may be threaded adjacent their ends and thereby adapted to be received in a threaded collar 20 mounted on the base 12. Other means of mounting the post 14, 16 and 18 upon base 12 are possible, such as cementing or merely slip-fitting the posts within the collars 20. Alternatively, the posts 14, 16 and 18 may be mounted directly into holes drilled in the ground.

As shown in FIGURE 1, a plurality of advertising copy retaining means 22 extends between each two of the posts 14, 16 and 18. Each of the retaining means mounted to the same two posts is spaced vertically from the adjacent retaining means mounted to the same two posts. Thus, the sides of the display apparatus are provided with openings through which the wind may pass. Accordingly, the sail effect or force of the wind upon the said display apparatus 10 is reduced.

The top and bottom edges of the retaining means 22 are bent over to form lips 24 and 26. Each of the lips 24 and 26 forms an acute angle with the planar surface or panel of the retaining means 22, thereby forming slots into which the advertising copy in the form of a rectangular card 28 may be inserted. The angle formed between the lips 24 and 26 and the panel surface of the retaining means 22 should be such that the cards 28 may be inserted and removed but are firmly held within the slots thus formed.

Figure 2:
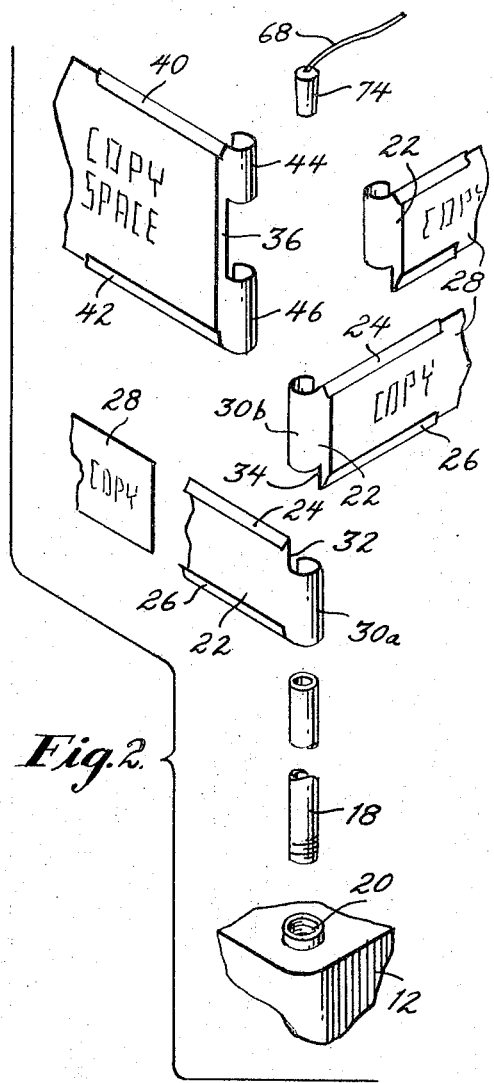
FIGURE 2 is an exploded view showing the construction of the display apparatus shown in FIGURE 1.
Figure 3:
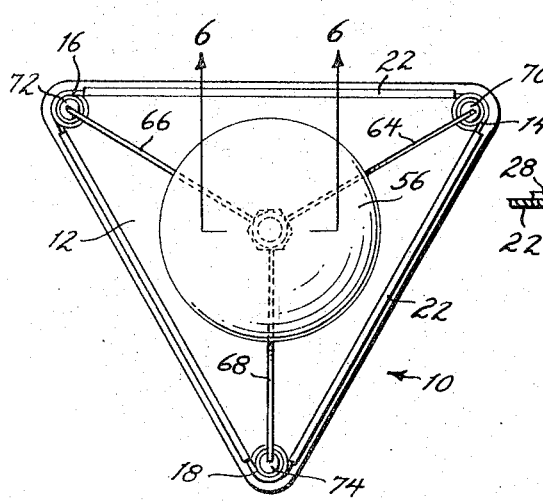
FIGURE 3 is a plan view of the embodiment shown in FIGURE 1.
Figure 4:
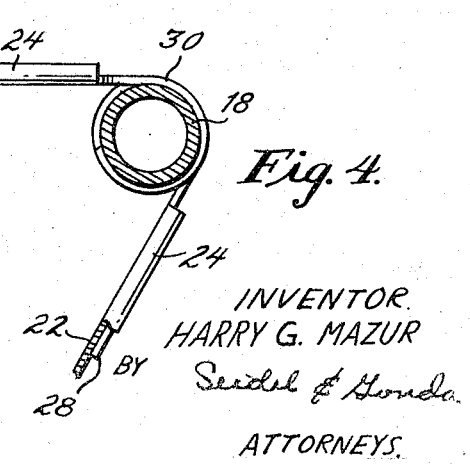
FIGURE 4 is an exemplary sectional view taken through one of the corners of the display apparatus shown in FIGURE 1.

The means for connecting the retaining means 22 to the posts 14, 16 and 18 is the same for each of said retaining means, and thus only one such connecting means will be described. Referring to FIGURE 2, there is shown a connecting means 30 extending from the retaining means 22. The connecting mean 30 is in the form of a curved member or partially open cylinder. The inside diameter of said curved member is equal to the outside diameter of the posts 14, 16 and 18. The axial length of the connecting member 30 is less than the height of the retaining means 22 for reasons to be explained below. As shown in FIGURE 4, the connecting member 30 receives the post 18 within its curved portion and thereby connects the retaining means 22 to said post.

As best shown in FIGURE 5, the connecting member 30a on the right side of retaining means 22 is mounted so that its bottom edge is even with the bottom edge of the retaining means 22. The connecting member 30b, identical in form to member 30a, is mounted so that its upper edge is even with the top edge of retaining means 22. Thus, since the connecting members 30 have an axial length which is less than the overall height of the retaining members 22, recesses 32 and 34 are provided adjacent diagonal corners of the retaining means 22. Further, even though the retaining means 22 be rotated 180° they will have the same form.

In addition to the retaining means 22, each display apparatus 10 will be provided with two enlarged retaining panels 36 and 38. Since the retaining panels 36 and 38 are the same in construction, only panel 36 will be described in detail.

The retaining panel 36 is provided with bent over lips 40 and 42 forming advertising card retaining slots in the same manner as described with respect to connecting member 30. Thus, each of the connecting members 44, 46, 48 and 50 has an inside diameter which is adapted to snugly receive one of the upright posts 14, 16 and 18. Connecting members 46 and 50 have an axial length that is equal to the axial length of connecting members 30. However, connecting member 46 is mounted even with the lower edge of retaining panel 36, whereas connecting member 50 is spaced intermediate the upper and lower edges of said retaining panel. Connecting members 44 and 48 are each mounted even with the upper edge of retaining panel 36 but have different axial lengths. The length of connecting member 44 is such that the space between its lower edge and the top edge of connecting member 46 is equal to the axial length 30 on retaining panels 22. Similarly, the axial length of connecting member 48 is such that its lower edge is spaced away from the upper edge of connecting member 50 by a distance equal to the axial length of connecting member 30.

The assembly of the retaining means 22 and retaining panels 36 and 38 on posts 14, 16 and 18 is best understood by reference to FIGURES 2 and 5. As shown, each of the retaining members is placed on posts 14, 16 and 18 so that its connecting members receive said posts within the curved cylindrical portions. The order of placing the retaining means 22 and retaining panels 36 and 38 on the posts is shown in FIGURE 5. Thus, each of the retaining means 22 fits onto a particular post so that its connecting member 30 fits within one of the recesses 32 or 34. In this manner, each of the retaining panels 22 is spaced vertically above the retaining panels connected to the same posts by a distance less than their height. Further, since each post supports one side edge of panels extending across and forming two sides of the triangular structure, a staggered relationship between the panels forming said two sides is created.

The retaining panels 36 and 38 serve two purposes. First, they provide an enlarged area for receiving advertising copy which it may be desirable to emphasize because of its increased size. Second, the retaining panels 36 and 38, which are mounted on the same side of the display apparatus, serve to complete that side which would otherwise be left with large openings at its top and bottom if only retaining means 22 were used. As shown, retaining panel 38 is inverted 180° relative to retaining panel 36. Accordingly, the retaining panel 38 is even with the lowermost edge of the lowest retaining panel 52. Similarly, retaining panel 36 has its uppermost edge even with the uppermost edge of the highest retaining means 22. When the assembly of the display apparatus is completed, a connecting member 30a will fit within the space between connecting members 48 and 50 and the connecting member 54 (similar to connecting member 30a) will fit between the connecting members 44 and 46 on display panel 38.

As shown in FIGURE 1, the display apparatus can also include an advertising ball or other sign structure 56. The ball is hollow and may be made of glass or plastic or any other translucent or transparent material. If desired, electrical means may be provided within the interior of the ball 56 for illuminating the same.

The ball 56 is mounted adjacent the top of the display apparatus 10 by means of a threaded stud 58 which is mounted to and projects from said ball 56. The stud 58 is threadedly engaged by an internally threaded member in the form of a nut 60. A spacer ring 62, which may be made of a soft, resilient material is provided around the stud 58 between the nut 60 and ball 56.

Guy wires 64, 66 and 68 are attached to the nut 60 by such means as welding or brazing and extend to the posts 14, 16 and 18 respectively. If desired, the nut 60 and threads on stud 58 may be eliminated and the guy wires 64, 66 and 68 welded directly to the stud. The guy wires 64, 66 and 68 are welded or otherwise attached to plugs 70, 72 and 74. The plugs 70, 72 and 74 fit within holes in the posts 14, 16 and 18. The guy wires 64, 66 and 68 are cut to a length sufficient to tautly retain the nut 60 substantially even with the top of display apparatus 10 so that the ball 56 extends above it. The guy wires 64, 66 and 68 may be either rigid rods or airplane cable.

In FIGURE 8, there is shown an article retaining member 76 which may be used to replace some or all of the retaining means 22. As shown, the article retaining member 76 comprises a bottom shelf 78 having vertical side walls 80, 82, 84 and 86. The retaining member 76 is provided with connecting members 88 and 90 which are similar in construction to connecting members 30 provided on retaining means 22. Connecting member 88 is spaced so that its lower edge is adjacent the bottom of retaining members 76 and connecting member 90 and is spaced so that its upper edge is even with the top of wall 82. This construction is similar to that provided for retaining means 22. Hence, the display apparatus 10 may be assembled with article retaining members 76 used in place of retaining means 22.

In FIGURE 9, there is shown an article display member 92. As shown, the display member 92 comprises top wall 94 and bottom wall 96 which depend from the back wall 98. Connecting members 100 and 102 which are similar to connecting members 88 and 90 and perform the same function are attached to and extend from the back wall 98.

A transparent window 104 extends from the top wall 94 to the bottom wall 96. The window 104 may be made of plastic or any other transparent material. It is the function of the window to provide a hollow enclosure in which articles may be displayed and yet be protected such as when the display apparatus 10 is used outdoors.

The display apparatus 10 has been shown in FIGURE 1 in a triangular arrangement. It is to be understood, however, that if desired the display apparatus could be erected in other forms. Thus, by way of example, the display apparatus could be erected in a zigzag arrangement which does not close upon itself. Rather, it is merely supported by posts at either end of the retaining means 22. Also, the arrangement shown in FIGURE 5 could be used by merely adding four posts. Of course, if such an arrangement is used, the ball 56 cannot be used.

Figure 10:
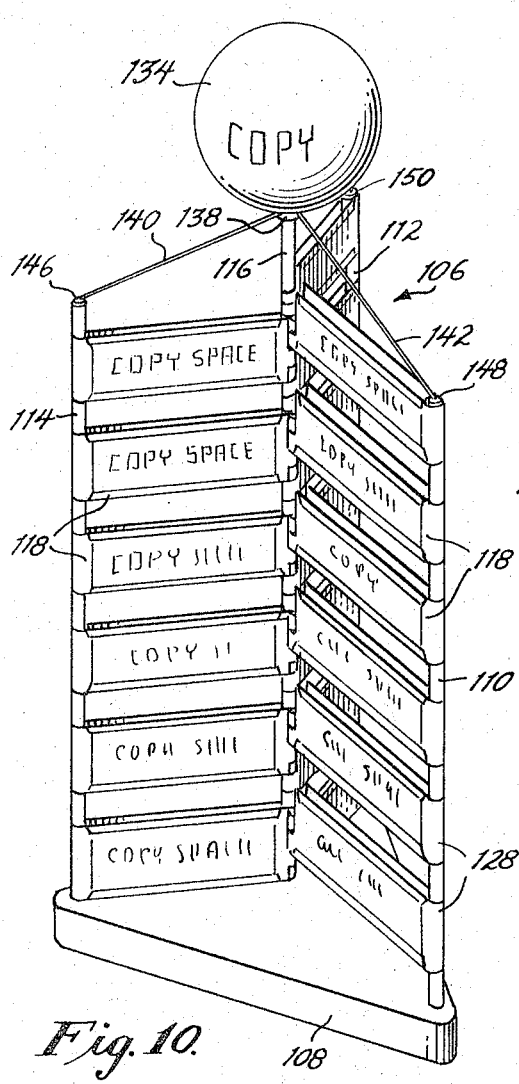
FIGURE 10 is a perspective view of a second embodiment of the present invention.
Figure 11:
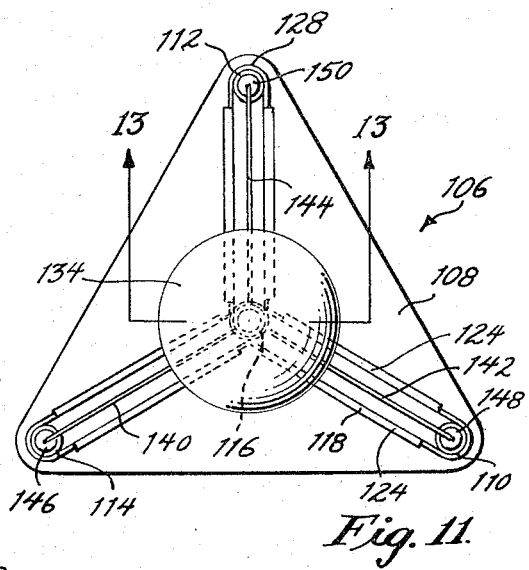
FIGURE 11 is a plan view of the embodiment shown in FIGURE 10.

Referring now to FIGURE 10, there is shown a second embodiment of the present invention. In this embodiment, the display apparatus 106 comprises a triangular base 108 which preferably is equilateral but need not be so dimensioned. The base 108 may be hollow. Posts 110, 112 and 114 are mounted adjacent each corner of the base 108 in a manner similar to that shown in FIGURE 2. A post 116 is mounted in the center of base 108 at a distance spaced equally from each of the posts 110, 112 and 114.

The post 116 supports one end of each of the dual retaining members 118. The other end of said dual retaining members is supported by posts 110, 112 and 114.

Figure 12:
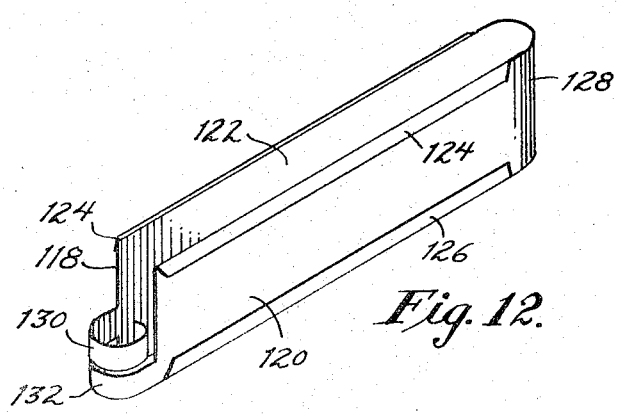
FIGURE 12 is a perspective view of an example of the retaining means used in the embodiment shown in FIGURE 10.

As shown in FIGURE 12, the dual retaining members 118 comprise a pair of similar rectangular panels 120 and 122 having upper and lower bent over edges forming lips 124 and 126. Said lips 124 and 126 are bent to form an acute angle with the plane of panels 120 and 122 and thereby provide slots for retaining advertising copy. The panels 120 and 122 are joined at one end by a curved member 128. The curvature of member 128 is such that its radius is equal to that of the posts 110, 112 and 114.

The ends of panels 120 and 122 which are not jointed are provided with connecting members 130 and 132. The connecting member 130 extends from panel 122 and curves toward panel 120 forming a partially open cylinder having a diameter equal to that of post 116. The connecting member 132 extends from panel 120 and curves towards panel 122 forming a partially open cylinder having an inside diameter equal to the outside diameter of post 116. As thus constructed, the connecting members 130 and 132 will receive the post 116 and thereby be supported upon said post.

As shown in FIGURE 12, the connecting members 130 and 132 are only slightly spaced apart. Further, said connecting members have an overall axial length which is equal to one-half that of the height of dual retaining member 118. The connecting member 132 is even with the bottom of dual connecting member 118. When assembled, the retaining members 118 will extend from post 116 to posts 110, 112 and 114 and be spaced apart from like retaining members 118 extending to the same post. The members 118, as shown in FIGURE 10 are mounted in partially overlapping alternate formation. Thus, each member 118 overlaps by one-half the next adjacent member 118 which extends to another one of the posts 110, 112 and 116.

The display apparatus 106 is assembled as follows:

A first retaining member 118 is placed on post 116 with its connecting members even with the top surface of base 108. A second retaining member 118 is then placed on post 116, then a third retaining member 118 is placed on post 116. Of course, each of the retaining members 118 is placed around its respective post 110, 112, and 114.

An advertising display ball 134 is mounted on the top of post 116. Said advertising display ball is hollow and made of a translucent or transparent material such as glass or plastic and may be illuminated if desired.

Figure 13:
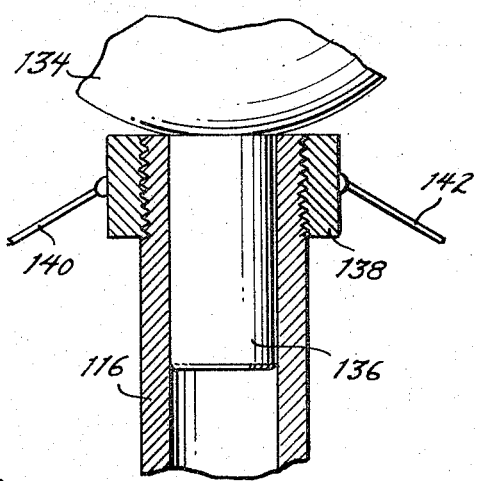
FIGURE 13 is a partial sectional view taken along the line 13—13 of FIGURE 11.

FIGURE 13 shows the manner in which the ball 134 is mounted on post 116. As shown, a cylindrical stud 136 is mounted to and extends from the ball 134 into the post 116. The end of the post 116 is threaded and an internally threaded ring 138 is mounted thereon. Guy wires 140, 142 and 144 are welded or otherwise attached to the ring 138. Alternatively, the guy wires 140, 142 and 144 may be welded directly to post 116. The ends of the guy wires 140, 142 and 144 are welded or otherwise attached to plugs 146, 148 and 150. The plugs 146, 148 and 150 are inserted in holes in posts 110, 112 and 114. The length of guy wires 140, 142 and 144 is adjusted so that they are taut and thereby retain ball 134 in place.

In FIGURE 14, there is shown an alternative construction for the guy wires 64, 66 and 68 or 140, 142 and 144. As shown, the guy wires may comprise a pair of rigid rods 182 which are connected together by means of a turnbuckle 184. One end of rod 182 is connected to the post 116A by an S-hook 180. The other end of the rigid rod 182 is connected to an I-hook 186 having a threaded stud thereon. The threaded stud is adapted to be received within the female member 188. The S-hook 180 may be swaged to the rod 182. The member 188 is shown mounted in a supporting member. This supporting member may be one of the outer posts or it may be a fixed masonry support. Thus, the member 188 could also be mounted within the post 110, 112 and 114 as are the plugs 146, 148 and 150. Thus, the embodiment shown in FIGURE 14 may be substituted for either of the guy wires shown in FIGURES 7 and 13.

From the foregoing description, it may be seen that a new and novel display apparatus has been described. Each of the display apparatus 10 and 106 contains a substantial number of interchangeable parts. Thus, if the base 108 is equilateral it may be used interchangeably with the base 112. Similarly, the posts 14, 16 and 18 and 110, 112, and 114 may be used interchangeably.

In each of the described embodiments, an advertising ball is mounted adjacent the topmost portion of the display apparatus. In addition to providing greater advertising space, the advertising balls together with their guy wires also provide the display apparatus with greater rigidity. That is, the construction provided by applicant is fully rigid. Further, the use of a construction of all welds and swages adds to the rigidity.

It should be noted that the display apparatus 10 and 106 can be made to any desired size. Thus, if it is desired to use it outdoors the posts can be as high as ten feet or higher. Similarly, if it is desired to use the apparatus indoors, the posts can be made as small as desired.

The triangular structure, together with the increased rigidity due to the guy wires, and the provision of the spaces between the retaining members allows the device to be used outdoors without substantial effects by wind force. Thus, the spaces between the retaining members reduce the effect of wind force. Further, the rigid triangular construction provides for whatever effect the force of wind may have. Further, these advantages are secured while at the same time retaining a light construction and economical use of materials. Still further, the similarity in construction between the type of display device used indoors and outdoors allows for simpler manufacturing methods.

Since the bases 12 and 108 are hollow, this may be used as storage means if desired.

The present invention may be embodied in other specific forms without departing from the spirit or essential attributes thereof and, accordingly, reference should be made to the appended claims, rather than to the foregoing specification as indicating the scope of the invention.

I claim:

1. A display device comprising three posts at equally spaced apart distances, a plurality of copy retaining means, said retaining means extending between and being connected to selected pairs of said posts, said retaining means that extend between any selected pair of posts being mounted in vertically spaced apart relationship, means protruding from said retaining means for connecting said retaining means to said posts, at least one of said posts being common to more than one of said pairs of posts, said means protruding from said retaining means being connected to said common posts in alternate relationship, the lowermost and uppermost of said retaining means extending between one of said pairs of posts being greater in height than the remainder of said retaining means, whereby the edges of the uppermost retaining means extending between at least two of said pairs of posts are equal in height.

2. A display device comprising at least three upright posts, a plurality of copy retaining means, said retaining means extending between and being connected to selected pairs of said posts, said retaining means that extend between any selected pair of posts being mounted in vertically spaced apart relationship, means protruding from said retaining means for connecting said retaining means to said posts, at least one of said posts being common to more than one of said pairs of posts, said means protruding from said retaining means being connected to said common posts in alternate relationship, said retaining means comprising rectangular panels having bent over upper and lower edges for receiving and retaining cards, said means for connecting said retaining means comprising curved members protruding from the side edges of said retaining means, each of said curved members having an axial length that is less than the height of said retaining means, and said members on one side of said retaining means being even with the lowermost edge thereof, and said members on the other side edge of said retaining means being even with the uppermost edge.

3. A display device comprising at least three upright posts, a plurality of copy retaining means, said retaining means extending between and being connected to selected pairs of said posts, said retaining means that extend between any selected pair of posts being mounted in vertically spaced apart relationship, means protruding from said retaining means for connecting said retaining means to said posts, at least one of said posts being common to more than one of said pairs of posts, said means protruding from said retaining means being connected to said common posts in alternate relationship, and a guide wire extending from each post for supporting an indicia bearing structure adjacent to the top of said display device.

4. A display device comprising at least three upright posts, a plurality of copy retaining means, said copy retaining means extending between and being connected to selected pairs of said posts, said retaining means that extend between any selected pair of posts being mounted in vertically spaced apart relationship, means protruding from said retaining means for connecting said retaining means to said posts, at least one of said posts being common to more than one of said pairs of posts, said means protruding from said retaining means being connected to said common posts in alternate relationship, a fourth post centrally disposed between said three posts at a distance equally spaced from said three posts, said retaining means extending from said central fourth post to said three posts, said retaining means comprising a pair of horizontally spaced apart rectangular panels joined together at one end by a portion adapted to extend around one of said three posts, the other end of said panel having connecting members extending therefrom, said connecting members being curved toward the opposite panel of said pair of panels, the axial length of said curved connecting members being such that they are adapted to engage said central post in alternate relationship, and said panels being arranged in staggered, partially overlapping, spaced apart relationship, and said pair of panels having bent over upper and lower edges receiving and retaining cards.

5. A display device comprising at least three upright posts, a plurality of copy retaining means, said retaining means extending between and being connected to selected pairs of said posts, said retaining means that extend between any selected pair of posts being mounted in vertically spaced apart relationship, means protruding from said retaining means for connecting said retaining means to said posts, at least one of said posts being common to more than one of said pairs of posts, said means protruding from said retaining means being connected to said common posts in alternate relationship, a fourth post centrally disposed between said three posts at a distance equally spaced from said three posts, said retaining means extending from said central fourth post to said three posts, indicia bearing structure mounted on top of said central fourth post, and guy wires extending from said central post to three outer posts.

6. A display apparatus comprising a support base, at least three vertical posts mounted upon said base, a plurality of copy retaining means adapted to be supported by said posts, each of said posts having several retaining means supported thereon, each of said retaining means being supported by two posts in vertically spaced apart relationship to retain means supported by the same two posts, said three posts being mounted on said base at equally spaced apart distances and said retaining means mounted on said posts forming a three sided structure, each said retaining means comprising a panel having bent over upper and lower lips for receiving and retaining a display card, and mounting members extending from each side of said panel, said mounting members comprising a curved portion adapted to receive one of said posts, a mounting member on one side of each said panel being adjacent the lower lip and a mounting member on the other side being adjacent the upper lip.

7. A display apparatus comprising a support base, at least three vertical posts mounted upon said base, a plurality of retaining means adapted to be supported by said posts, each of said posts having several retaining means supported thereon, each of said retaining means supported by two posts in vertically spaced apart relationship to retaining means supported by the same two posts, said retaining means comprising shelves, a pair of mounting members attached to each shelf, each mounting member comprising a curved portion adapted to receive one of said two supporting posts, and one of said pair of mounting members being vertically spaced above the other mounting member of said pair.

8. A display apparatus comprising a support base, at least three vertical posts mounted upon said base, a plurality of retaining means adapted to be supported by said posts, each of said posts having several retaining means supported thereon, each of said retaining means being supported by two posts in vertically spaced apart relationship to said retaining means supported by the same two posts, said retaining means comprising a box-like enclosure, at least the front and sides of said enclosure being made of a transparent material, a pair of mounting members attached at each side of said box, each mounting member comprising a curved portion adapted to receive one of said supporting posts, and one of said pair of mounting members being vertically spaced above the other mounting member.

9. Apparatus in accordance with claim 5 wherein said indicia bearing structure is an illuminatable ball, a cylindrical plug extending from said ball, said plug being adapted to be received within said central post.

10. A device in accordance with claim 5 wherein two of said panels have a greater height than the remainder of the panels, and said two panels are mounted on one side of said structure so as to make the lowermost extension of said side even with a second side and make the uppermost extension even with a third side, and said two panels being provided with two mounting members on each side thereof.

11. A device in accordance with claim 5 wherein a globe is mounted adjacent the top of said structure, mounting for said globe, said mounting means comprising a threaded rod protruding from said globe, an internally threaded member adapted to receive said rod, and guy wires extending from said threaded member to said posts.

12. A display apparatus comprising a support base, at least three vertical posts mounted upon said base, a plurality of retaining means adapted to be supported by said posts, each of said posts having several retaining means supported thereon, each of said retaining means being supported by two posts in vertically spaced apart relation to retaining means supported by the same two posts, said three posts being mounted on said base and a fourth post mounted at a position equally spaced from said three posts, each said retaining means extending from said fourth post to one of said three posts, said retaining means being mounted on said fourth post in serial staggered relationship relative to one of the three posts to which said retaining means extends, and each of said retaining means comprising a pair of panels having bent over upper and lower lips, curved means joining one of the ends of said panels, said curved means being adapted to receive one of said three posts, and each of the other ends of said panels having connecting members protruding therefrom, each said connecting member having a portion curved toward the other panel in said pair, said curved portions being adapted to receive said fourth post, and the combined height of said connecting members being less than the height of said panel.

13. A device in accordance with claim 12 wherein a ball is mounted adjacent the top of said fourth post, mounting means for said ball, said mounting means including a stud extending from said ball, a hole in said fourth post to receive said stud, and guy wires extending through said fourth post to each of said three posts.

References Cited by the Examiner

UNITED STATES PATENTS

| | | | |
|---|---|---|---|
| 1,766,362 | 6/1930 | Sears | 40—63 |
| 1,943,295 | 1/1934 | Block | 40—125 |
| 2,258,560 | 10/1941 | Trunzer | 40—125 |
| 2,515,818 | 7/1950 | Bennett | 40—125 |
| 2,970,396 | 2/1961 | Worrell | 40—125 |

EUGENE R. CAPOZIO, *Primary Examiner.*

W. J. CONTRERAS, *Assistant Examiner.*